United States Patent
Xu et al.

(10) Patent No.: US 9,819,384 B2
(45) Date of Patent: Nov. 14, 2017

(54) MULTIPLEXER DEVICE WITH MULTIPLE NOTCH FILTERS CONNECTED IN PARALLEL

(71) Applicant: Avago Technologies General IP (Singapore) Pte. Ltd., Singapore (SG)

(72) Inventors: Hongya Xu, Munich (DE); Andriy Yatsenko, Munich (DE); Lueder Elbrecht, Munich (DE); Martin Handtmann, Riemerling (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 164 days.

(21) Appl. No.: 14/522,169

(22) Filed: Oct. 23, 2014

(65) Prior Publication Data

US 2016/0119017 A1  Apr. 28, 2016

(51) Int. Cl.
| | | |
|---|---|---|
| *H04B 1/46* | (2006.01) | |
| *H04B 1/48* | (2006.01) | |
| *H04L 25/02* | (2006.01) | |
| *H04B 1/10* | (2006.01) | |
| *H04B 1/18* | (2006.01) | |

(52) U.S. Cl.
CPC ............. *H04B 1/48* (2013.01); *H04B 1/109* (2013.01); *H04B 1/1036* (2013.01); *H04B 1/18* (2013.01); *H04L 25/0278* (2013.01); *H04B 2001/1063* (2013.01); *H04B 2001/485* (2013.01)

(58) Field of Classification Search
CPC ... H04B 1/1036; H04B 1/48; H04B 2001/485
USPC .......................................................... 455/79
See application file for complete search history.

(56) References Cited

U.S. PATENT DOCUMENTS

| | | | |
|---|---|---|---|
| 8,462,755 B2 | 6/2013 | Jian et al. | |
| 2005/0164888 A1 | 7/2005 | Hey-Shipton | |
| 2014/0055210 A1* | 2/2014 | Black | ................. H04B 1/525 333/132 |

OTHER PUBLICATIONS

Daniel P. Kaegebein, "T-Pass Expandable Cavity Multicoupler System", Seminar Subjects, 1980 TX AX Systems, Inc., pp. 1-11.

\* cited by examiner

*Primary Examiner* — Ajibola Akinyemi

(57) ABSTRACT

A multiplexer device includes an antenna node connected to an antenna for at least one of receiving and transmitting signals; multiple band pass filters connected to the antenna node, each band pass filter having a different passband; and multiple notch filters connected in to the antenna node and the multiple band pass filters, each notch filter having a different stopband corresponding to one of the passbands of the band pass filters. The notch filters are connected in parallel with one another in order to reduce insertion loss.

18 Claims, 5 Drawing Sheets

MULTIPLEXER DEVICE WITH MULTIPLE NOTCH FILTERS CONNECTED IN PARALLEL

BACKGROUND

Portable communication devices, such as cellular telephones, portable computers, personal digital assistants (PDAs), global positioning system (GPS) receivers, and the like, are configured to communicate over wireless networks. Such portable communication devices may enable communication over multiple networks, and therefore include transmitters, receivers and corresponding filters in multiplexers, connecting the receivers and transmitters to a common antenna, for sending and receiving signals (e.g., radio frequency (RF) signals) over various wireless networks.

The multiplexer interfaces between the antenna and each of the networks to enable transmitting signals on different transmit (uplink) frequencies and receiving signals on different receive (downlink) frequencies. The filters associated with the multiplexer include band pass filters and band rejection (or notch) filters. The band pass filters provide passbands for passing various transmitted and received signals through relatively narrow frequency bands (blocking all signals with frequencies outside the passbands), while the notch filters provide stopbands for blocking various transmitted and received signals in relatively narrow frequency bands (passing all signals with frequencies outside the stopbands). The band pass filters and notch filters may be used in a complementary fashion, such that notch filter(s) associated with a first network have stopband(s) that correspond to (e.g., match) passband(s) of band pass filters(s) associated with a second network. In this manner, the likelihood of the signals of the second network passing through the band pass filter interfering with the signals of the first network is greatly reduced.

Conventional multiplexers providing band pass and notch filters for different networks, as shown in FIGS. 3 and 4, tend to have complicated designs with high insertion loss. Examples of conventional multiplexer devices are discussed below with reference to FIGS. 3 and 4. Referring to FIGS. 3 and 4, each band pass filter corresponding to a particular network has an associated notch filter that provides a stopband corresponding to the pass band of the band pass filter. In FIG. 3, the notch filters are arranged in a cascading topology, and in FIG. 4, the notch filters are arranged in a series topology. However, a multiplexer device with less insertion loss caused by the arrangement of band pass and notch filters is desirable.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
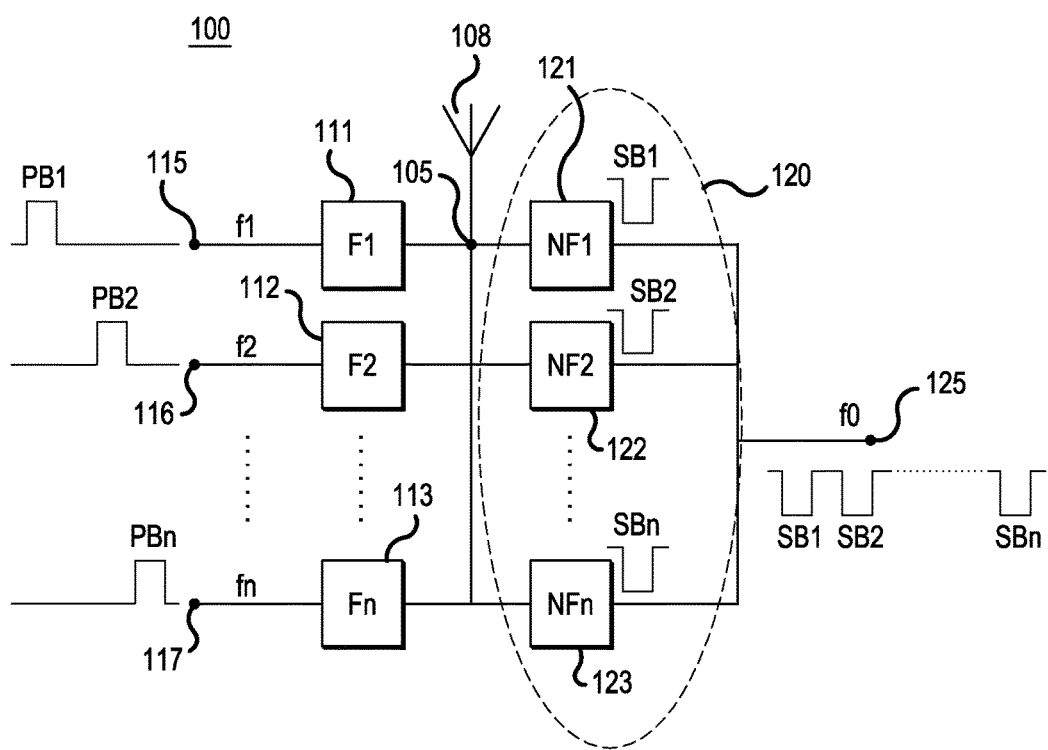
FIG. 1 is a simplified block diagram of a multiplexer device including parallel connected notch filters, according to a representative embodiment.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

It is understood that the drawings and the various elements depicted therein are not drawn to scale. Further, relative terms, such as "above," "below," "top," "bottom," "upper" and "lower" are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be below that element.

Generally, according to various embodiments, a multiplexer device is provided for selecting a network among various networks to access a common antenna for at least one of transmitting and receiving wireless signals (e.g., RF signal). The multiplexer device includes multiple band pass filters connected between corresponding networks and an antenna node, which is connected to the common antenna. Each band pass filter has a different passband(s). In addition, the multiplexer device includes multiple notch filters connected between another network, such as a cellular network, and the antenna node, where the notch filters are associated with the band pass filters, respectively. The notch filters are connected in parallel with one another between the network and the antenna node. Each notch filter has a different stopband(s) corresponding the passband(s) of the associated band pass filter, e.g., for rejecting operating frequenc(ies) of the associated band pass filter or otherwise creating a stop condition on operating frequenc(ies) of the associated band pass filter.

FIG. 1 is a block diagram of a multiplexer device including parallel notch filters, according to a representative embodiment.

Referring to FIG. 1, a multiplexer device 100 includes a common antenna node 105 connected to an antenna 108 for receiving and/or transmitting signals, such as RF signals corresponding to various networks. The multiplexer device 100 further includes multiple band pass filters, indicated by representative first band pass filter 111, second band pass filter 112 and nth band bass filter 113 (n being a positive integer greater than 2), connected to the antenna node 105. Each of the first through nth band pass filters 111-113 has a different passband at corresponding operating frequencies. That is, the first band pass filter 111 has a first passband PB1 at operation frequency f1, the second band pass filter 112 has a second passband PB2 at operation frequency f2, and the nth band pass filter 113 has an nth passband PBn at operation frequency fn. The first through nth band pass filters 111-113 thereby block (filter out) frequencies outside their respective passbands.

The first through nth band pass filter 111-113 may be connected to different networks via corresponding network nodes, respectively, for filtering RF signals transmitted (uplinked) and/or received (downlinked) by the network. Therefore, the first band pass filter 111 is connected to a first network node 115 for communicating with a first network, the second band pass filter 112 is connected to a second network node 116 for communicating with a second network, and the nth band pass filter 113 is connected to an nth network node 117 for communicating with an nth network, as discussed below in more detail.

The multiplexer device 100 also includes multiple notch filters in a notch filter path 120, indicated by representative first notch filter 121, second notch filter 122 and nth notch filter 123. The first through nth notch filters 121-123 are connected in parallel with one another between the common antenna node 105 and a third network node 125, in order to reduce insertion loss and to act as an impedance matching structure. The notch filter path 120 comprises the combined parallel paths of the first through nth notch filters 121-123. Accordingly, the first through third notch filters 121-123 are connected to the same network (third network) via a third network node 125 for filtering RF signals transmitted (uplinked) and/or received (downlinked) by the third network. The parallel connection of the first through nth notch filters 121-123 decreases transfer loss of the notch filter path 120.

Each of the first through nth notch filters 121-123 has a different stopband (at operating frequency f0) that corresponds to a passband of one of the first through nth band pass filters 111-113. For example, in the depicted embodiment, the first notch filter 121 has a first stopband SB1 corresponding to the first passband PB1, the second notch filter 122 has a second stopband SB2 corresponding to the second passband PB2, and the nth notch filter 123 has an nth stopband SBn corresponding to the nth passband PBn. Thus, the first through nth notch filters 121-123 create a "stop" condition on the operating frequencies f1 through fn of the first through nth band pass filters 111-113, respectively. This enables energy transmission for the related first through nth pass band filters 111-113 without significant losses. That is, the first through nth notch filters 121-123 minimize losses (insertion losses) during energy transmission for the corresponding first through nth band pass filters 111-113.

The first through nth networks connected to the antenna node 105 via the first through nth band pass filters, respectively, and the third network connected to the antenna node 105 via the first through nth notch filters 121-123 are non-matching structures. In the depicted embodiment, the parallel connected first through nth notch filters 121-123 operate as an impedance matching circuit for the antenna node 105 and each of the first through nth band pass filter 111-113 and the notch filter path 120.

Figure 2:
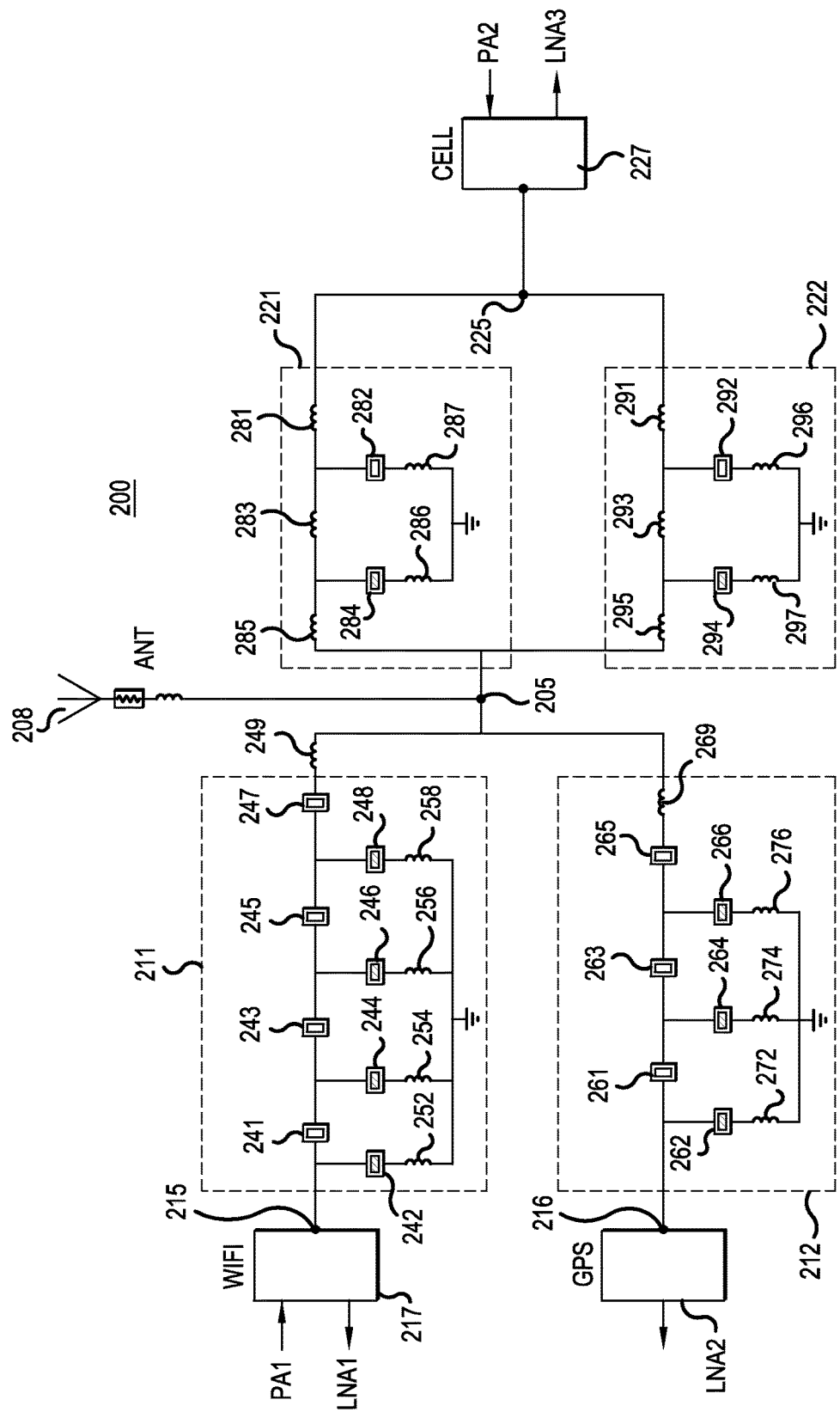
FIG. 2 is a simplified block diagram of a multiplexer device including parallel connected notch filters, according to a representative embodiment.

FIG. 2 is a block diagram of a multiplexer device including parallel connected notch filters, according to a representative embodiment.

Referring to FIG. 2, a multiplexer device 200 includes an antenna node 205 connected to an antenna 208 for receiving and/or transmitting signals, such as RF signals corresponding to three different networks, discussed below. In the depicted embodiment, the multiplexer device 200 further includes a first band pass filter 211 connected between the antenna node 205 and a first network node 215 for accessing a first network, depicted as a Wifi network (IEEE 802.11), for example, and a second band pass filter 212 connected between the antenna node 205 and a second network node 216 for accessing a second network, depicted as a GPS network, for example. Alternatively, the first network may be a Bluetooth network (IEEE 802.15.1), and/or the second network may be a Galileo communication system network, a BeiDou-2 communication system network or a GLONASS network, for example, although the various embodiments are not limited thereto.

The first network node 215 may be connected to a switch or coupler 217 configured to transfer RF signals from a transmitter (not shown) to the antenna node 205 via a power amplifier PA1, and to transfer RF signals to a receiver (not shown) from the antenna node 205 via a low noise amplifier LNA1, for example. The second network node 216 may be connected to a low noise amplifier LNA2 configured to transfer RF signals to a receiver (not shown) from the antenna node 205, for example.

As mentioned above, each of the first and second band pass filters 211 and 212 has a different passband at corresponding operating frequencies in their respective networks. In the depicted example, the first band pass filter 211 is a ladder filter comprising acoustic resonator filter elements, such as surface acoustic wave (SAW) resonators or bulk acoustic wave (BAW) resonators. The BAW resonators may include thin film bulk acoustic resonators (FBARs) and/or solidly mounted resonators (SMRs), for example. More particularly, the first band pass filter 211 includes series acoustic resonators 241, 243, 245 and 247 and shunt acoustic resonators 242, 244, 246 and 248.

The shunt acoustic resonator 242 is connected between the first network node 215 and the series acoustic resonator 241. The shunt acoustic resonator 244 is connected between the series acoustic resonators 241 and 243. The shunt acoustic resonator 246 is connected between the series acoustic resonators 243 and 245. The shunt acoustic resonator 248 is connected between the series acoustic resonators 245 and 247. The shunt acoustic resonators 242, 244, 246 and 248 are also connected to ground via shunt inductors 252, 254, 256 and 258, respectively. A series inductor 249 is connected between the series acoustic resonator 247 and the antenna node 205. Of course, various arrangements of acoustic resonators, inductor(s) and/or other circuit elements may vary, to provide unique benefits for particular situations or to meet application specific design requirements of various implementations of band pass filters and corresponding networks, as would be apparent to one skilled in the art.

Similarly, in the depicted example, the second band pass filter 212 is a ladder filter comprising acoustic resonator filter elements, such as SAW resonators or BAW resonators, which may include FBARs and/or SMRs, for example. More particularly, the second band pass filter 212 includes series acoustic resonators 261, 263 and 265 and shunt acoustic resonators 262, 264 and 266. The shunt acoustic resonator 262 is connected between the second network node 216 and the series acoustic resonator 261. The shunt acoustic resonator 264 is connected between the series acoustic resonators 261 and 263. The shunt acoustic resonator 266 is connected between the series acoustic resonators 263 and 265. The shunt acoustic resonators 262, 264 and 266 are also connected to ground via shunt inductors 272, 274 and 276, respectively. A series inductor 269 is connected between the series acoustic resonator 265 and the antenna node 205. Of course, various arrangements of acoustic resonators, inductor(s) and/or other circuit elements may vary, to provide unique benefits for particular situations or to meet application specific design requirements of various implementations of band pass filters and corresponding networks, as would be apparent to one skilled in the art.

The multiplexer device 200 also includes a first notch filter 221 and a second notch filter 222 connected between the antenna node 205 and a third network node 225 for accessing a cellular network, for example. The cellular network may follow any of various cellular and connectivity standards, including 3GPP bands, such as band 1 (uplink 1920-1980 MHz; downlink 2110-2170 MHz), band 2 (uplink 1850-1910 MHz; downlink 1930-1990 MHz), band 3 (uplink 1930-1990 MHz; downlink 1805-1880 MHz), band 4 (uplink 1710-1755 MHz; downlink 2110-2155 MHz), band 5 (uplink 824-849 MHz; downlink 869-894 MHz), band 7 (uplink 2500-2570 MHz; downlink 2620-2690 MHz), band 8 (uplink 880-915 MHz; downlink 925-960 MHz), band 20 (uplink 832-862 MHz; downlink 791-821 MHz), band 38 (2570-2620 MHz) and band 40 (2100-2400 MHz), for example, although other types of networks and/or other frequency bands may be incorporated without departing from the scope of the present teachings.

Generally, impedance matching circuits enable the multiplexer device 200 to interface with the respective receivers and/or transmitters. However, first and second notch filters 221 and 222 provide impedance matching for the multiplexer device 200 to interface with the antenna 108, as mentioned above with reference to the notch filter path 120. That is, the parallel connected first and second notch filters 221 and 222 operate as an impedance matching circuit for the antenna node 205 and each of the first band pass filter 211 and the second band pass filter 212.

The third network node 225 may be connected to a switch or coupler 227 configured to transfer RF signals from a transmitter (not shown) to the antenna node 205 via a power amplifier PA2, and to transfer RF signals to a receiver (not shown) from the antenna node 205 via a low noise amplifier LNA3, for example.

In the depicted example, the first notch filter 221 includes series inductors 281, 283 and 285, and shunt acoustic resonators 282 and 284. The shunt acoustic resonator 282 is connected between the series inductors 281 and 283, and the shunt acoustic resonator 284 is connected between the series inductors 283 and 285. The shunt acoustic resonators 282 and 284 are also connected to ground via shunt inductors 286 and 287, respectively. The second notch filter 222 includes series inductors 291, 293 and 295, and shunt acoustic resonators 292 and 294. The shunt acoustic resonator 292 is connected between the series inductors 291 and 293, and the shunt acoustic resonator 294 is connected between the series inductors 293 and 295. The shunt acoustic resonators 292 and 294 are also connected to ground via shunt inductors 296 and 297, respectively. Of course, various arrangements of acoustic resonators, inductor(s) and/or other circuit elements may vary, to provide unique benefits for any particular situation or to meet application specific design requirements of various implementations of the band pass filter and the corresponding network, as would be apparent to one skilled in the art.

Returning to FIG. 1, the parallel arrangement of the first through nth notch filters 121-123 minimizes insertion loss during energy transmission for the corresponding first through nth band pass filters 111-113, as mentioned above. Comparison to conventional multiplexer devices with band pass filters and corresponding notch filters illustrates this improved performance.

Figure 3:
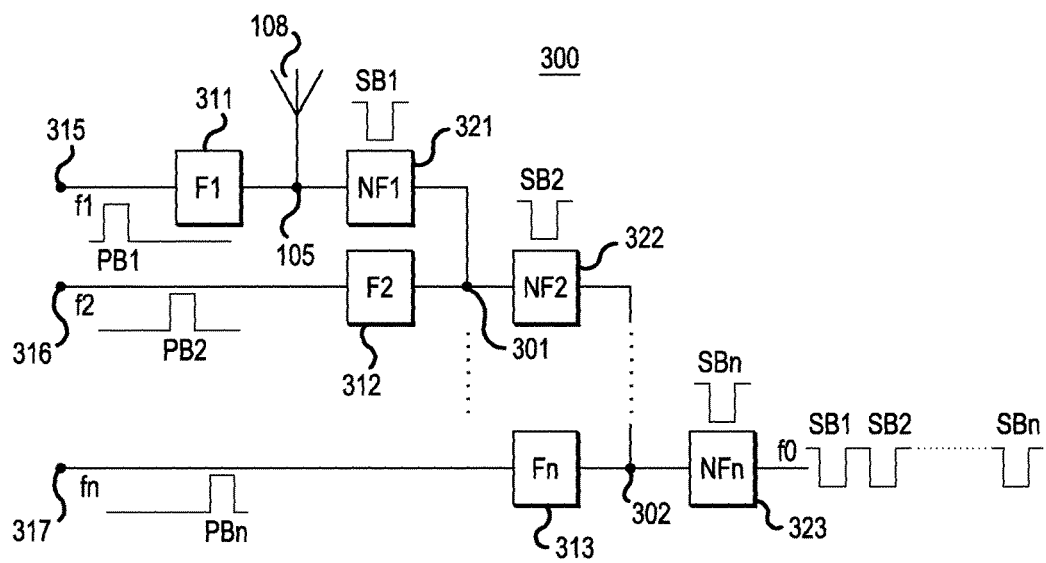
FIG. 3 is a simplified block diagram of a conventional multiplexer device including cascading notch filters.
Figure 4:
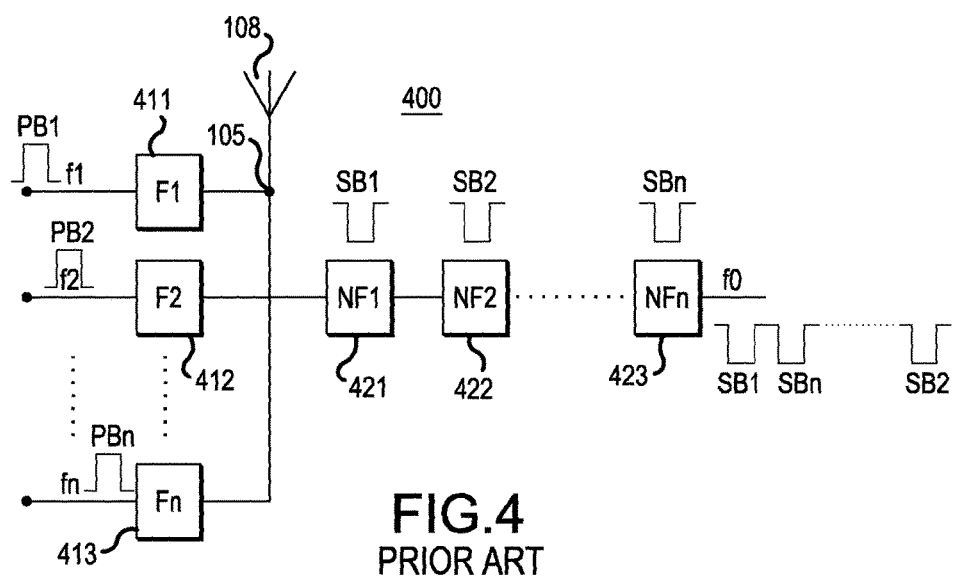
FIG. 4 is a simplified block diagram of a conventional multiplexer device including series connected notch filters.

For example, FIG. 3 is a simplified block diagram of a conventional multiplexer device including cascading notch filters, and FIG. 4 is a simplified block diagram of a conventional multiplexer device including series connected notch filters.

Referring to FIG. 3, conventional multiplexer device 300 includes an antenna node 105, first through nth band pass filters 311-313, and first through nth notch filters 321-323. The first through nth band pass filters 311-313 are paired with first though nth notch filters 321-323 in a cascading arrangement. In particular, the antenna node 305 is connected between the first band pass filter 311 and the first notch filter 321, node 301 is connected between the second band pass filter 312 and the second notch filter 322, and node 302 is connected between the nth band pass filter 313 and the nth notch filter 323. As discussed above with reference to FIG. 1, the first through nth band pass filters 311-313 have different passbands at corresponding operating frequencies f1-fn, and are connected to different network nodes 315, 316 and 317, respectively. The first through nth notch filters 321-323 have different stopbands that correspond to the different passbands of the first through nth band pass filters 311-313, respectively.

Referring to FIG. 4, conventional multiplexer device 400 includes an antenna node 105, first through nth band pass filters 411-413, and first through nth notch filters 421-423. The first through nth band pass filters 411-413 have different passbands at corresponding operating frequencies, and are connected between different network nodes 415, 416 and 417, respectively, and the antenna node 105. The first through nth notch filters 421-423 are connected in series between yet another network node 425 and the antenna node 105. The first through nth notch filters 421-423 have different stopbands that correspond to the different passbands of the first through nth band pass filters 411-413, respectively.

Figure 5:
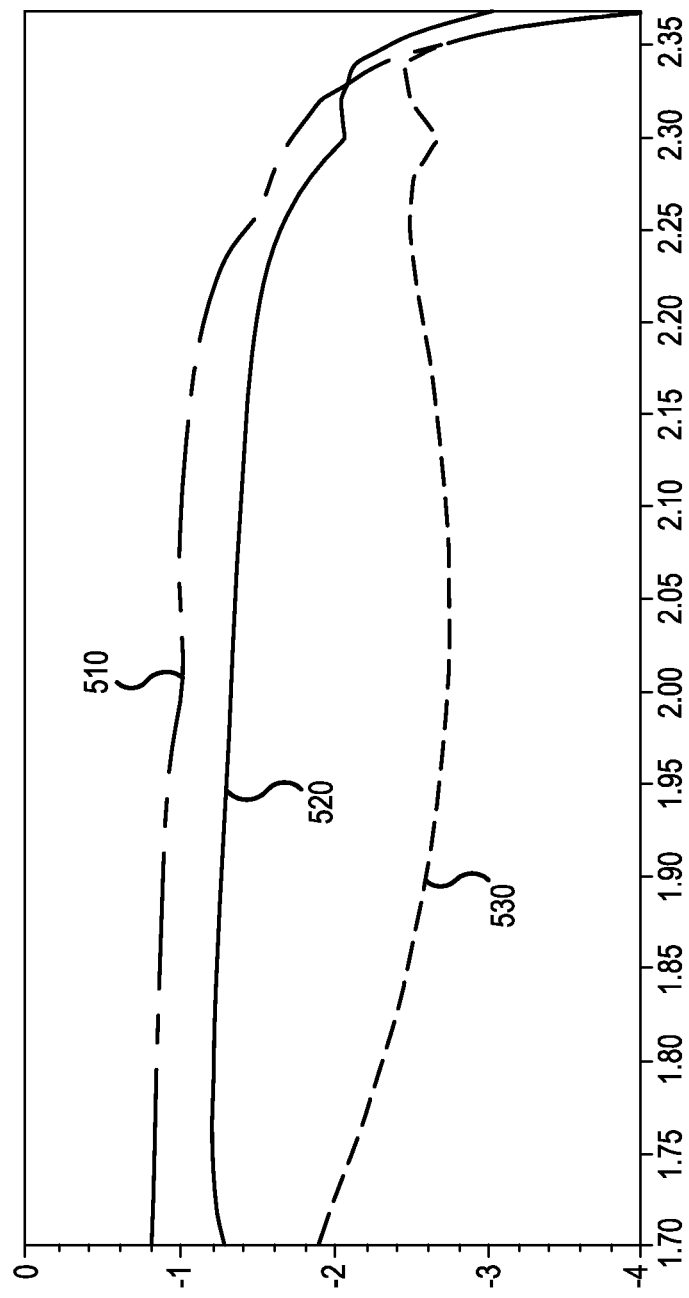
FIG. 5 is a graph showing insertion loss at a cellular network node as function of signal frequency, for purposes of comparing responses of conventional cascading and series arrangements of notch filters with a parallel arrangement of notch filters, according to a representative embodiment.

FIG. 5 is a graph showing insertion loss in dB at a cellular network node as function of RF signal frequencies in GHz, for purposes of comparing responses of conventional cascading and series arrangements of notch filters with a parallel arrangement of notch filters, according to a representative embodiment.

Referring to FIG. 5, trace 510 corresponds to the parallel arrangement of notch filters (e.g., shown in FIG. 1), according to various embodiments. Traces 520 and 530 correspond to a conventional cascading arrangement of notch filters (e.g., shown in FIG. 5) and a conventional series arrangement of notch filters (e.g., shown in FIG. 6), respectively. As shown in FIG. 5, the parallel arrangement of notch filters provides lower insertion loss (higher power) than both the cascading and series arrangements of notch filters at all frequencies from about 1.70 GHz to about 2.33 GHz. For example, at about 1.92 GHz (in the frequency range the band 1 uplink), trace 510 indicates −0.9 dB of power for the parallel arrangement of notch filters, trace 520 indicates −1.3 dB for the cascading arrangement of notch filters, and trace 530 indicates −2.6 dB for the series arrangement of notch filters.

Figure 6A:
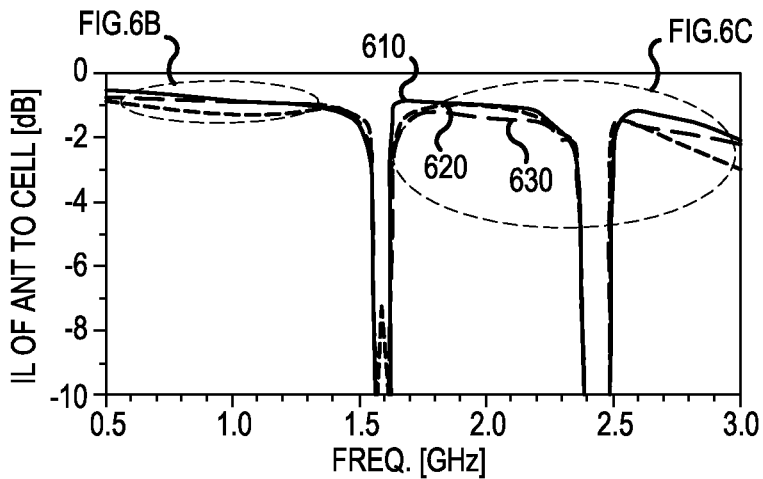
FIG. 6A is a graph showing insertion loss at a cellular network node as function of signal frequency, for purposes of comparing responses of conventional cascading and series arrangements of notch filters with a parallel arrangement of notch filters, according to a representative embodiment.
Figure 6B:
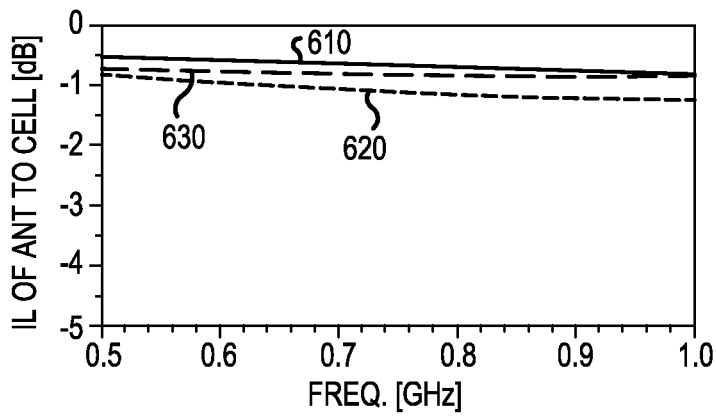
FIGS. 6B and 6C are graphs showing zoomed-in portions of the graph shown in FIG. 6A.
Figure 6C:
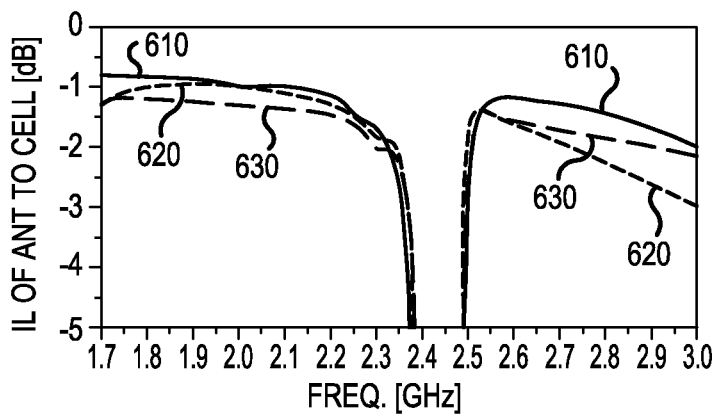

FIGS. 6A, 6B and 6C are graphs showing insertion loss of the antenna to the cellular network node in dB as function of RF signal frequencies in GHz, for purposes of comparing responses of conventional cascading and series arrangements of notch filters with a parallel arrangement of notch filters, according to a representative embodiment.

Referring to FIG. 6A, trace 610 corresponds to the parallel arrangement of notch filters (e.g., as shown in FIG. 1) according to various embodiments. Traces 620 and 630 correspond to a conventional cascading arrangement of notch filters (e.g., as shown in FIG. 3) and a conventional series arrangement of notch filters (e.g., as shown in FIG. 4), respectively. As shown in FIG. 6A, the parallel arrangement of notch filters provides higher power (less insertion loss) than both the cascading and series arrangements of notch filters. This can be seen more clearly in FIG. 6B, which is a zoomed-in view of the insertion loss from 0.5 GHz to 1.0 GHz, immediately before the cellular network stopband corresponding to the GPS passband (at about 1.6 GHz), where trace 610 is at consistently a higher dB than traces 620 and 630. Similarly, in FIG. 6C, which is a zoomed-in view of the insertion loss from 1.7 GHz to 3.0 GHz, including the cellular network stopband corresponding to the Wifi passband (at about 2.45 GHz), where trace 610 is at a higher dB than traces 620 and 630, particular at frequencies greater than about 2.55 GHz.

The various components, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. A multiplexer device, comprising:
an antenna node connected to an antenna for at least one of receiving and transmitting signals;
a plurality of band pass filters connected to the antenna node, each band pass filter having a different passband; and
a plurality of notch filters connected in to the antenna node and the plurality of band pass filters, each notch filter having a different stopband corresponding to a passband of one of the plurality of band pass filters,
wherein the plurality of notch filters are connected in parallel with one another, in order to reduce insertion loss during energy transmission for the corresponding band pass filter.

2. The multiplexer device of claim 1, wherein the parallel connected notch filters operate as an impedance matching circuit for the antenna and each band pass filter.

3. The multiplexer device of claim 1, wherein the stopband of each notch filter creates a stop condition on an operating frequency of the corresponding band pass filter.

4. The multiplexer device of claim 1, wherein the parallel connected notch filters decrease transfer loss of a notch filter path comprising the plurality of notch filters connected in parallel.

5. The multiplexer device of claim 1, wherein each notch filter comprises a plurality of inductors and a plurality of shunt acoustic resonators, each shunt acoustic resonator being connected between two of the plurality of inductors and ground.

6. The multiplexer device of claim 5, wherein each band pass filter is a ladder filter comprising a plurality of series acoustic resonators and a plurality of shunt acoustic resonators.

7. The multiplexer device of claim 1, wherein the plurality of band pass filters connected to the antenna node comprise a band pass filter connected to at least one of a Wifi network or a Bluetooth network, and a band pass filter connected to at least one of a Global positioning System (GPS) network, a Galileo communication system network, a BeiDou-2 communication system network and a GLONASS network.

8. The multiplexer device of claim 7, wherein the parallel connected notch filters are connected between the antenna node and a cellular network.

9. A multiplexer device, comprising:
a first band pass filter having a first passband for transmitting a first signal to or from a common node;
a second band pass filter having a second passband, different from the first passband, for transmitting a second signal to or from the common node;
a first notch filter having a first stopband, corresponding to the first passband, for rejecting an operating frequency of the first band pass filter; and
a second notch filter having a second stopband, corresponding to the second passband, for rejecting an operating frequency of the second band pass filter, the second notch filter being connected in parallel with the first notch filter between the common node and a network node,
wherein the parallel connected first and second notch filters function as an impedance matching structure for the common node and each of the first and second band pass filters.

10. The multiplexer device of claim 9, wherein the parallel connected first and second notch filters are configured to reduce insertion loss.

11. The multiplexer device of claim 9, wherein the stopband of each of the first and second notch filters creates a stop condition on an operating frequency of the corresponding first and second band pass filters, respectively, minimizing insertion losses.

12. The multiplexer device of claim 9, wherein each of the first and second notch filter comprises a plurality of inductors and a plurality of shunt acoustic resonators, each shunt acoustic resonator being connected between two of the plurality of inductors and ground.

13. The multiplexer device of claim 12, wherein each band pass filter is a ladder filter comprising a plurality of series acoustic resonators and a plurality of shunt acoustic resonators.

14. A multiplexer device, comprising:
a first band pass filter connected between a first network and a common antenna, the first band pass filter having a first passband;
a second band pass filter connected between a second network and the common antenna, the second band pass filter having a second passband different from the first passband; and
a notch filter path comprising a first notch filter connected in parallel with a second notch filter between a third network and the common antenna, the first notch filter having a first stopband corresponding to the first passband of the first band pass filter and the second notch filter having a second stopband corresponding to the second passband of the second band pass filter.

15. The multiplexer device of claim 14, wherein the notch filter path is configured to act as an impedance matching circuit with respect to the first and second band pass filters and the common antenna.

16. The multiplexer device of claim 15, wherein the notch filter path is further configured to minimize insertion losses during energy transmission for the first and second band pass filters.

17. The multiplexer device of claim 15, wherein the third network comprises a cellular network.

18. The multiplexer device of claim 17, wherein first network comprises a Wifi or a Bluetooth network, and at second network comprises one of a Global positioning System (GPS) network, a Galileo communication system network, a BeiDou-2 communication system network and a GLONASS network.

* * * * *